United States Patent
Lin et al.

(10) Patent No.: US 9,913,326 B1
(45) Date of Patent: Mar. 6, 2018

(54) LIGHT EMITTING DIODE DRIVING CIRCUIT WITH STABLE DRIVING CURRENT

(71) Applicant: EDISON OPTO (DONGGUAN) CO., LTD., Dongguan, Guang Dong (CN)

(72) Inventors: Yu-Chen Lin, Dongguan (CN); Hung-Chan Wang, Dongguan (CN); Tsung-Heng Lin, Dongguan (CN)

(73) Assignee: EDISON OPTO (DONGGUAN) CO., LTD., Dongguan, Guang Dong (CN)

( * ) Notice: Subject to any disclaimer, the term of this patent is extended or adjusted under 35 U.S.C. 154(b) by 0 days.

(21) Appl. No.: 15/647,256

(22) Filed: Jul. 11, 2017

(30) Foreign Application Priority Data

May 5, 2017 (CN) .......................... 2017 1 0312884

(51) Int. Cl.
  *H05B 37/00* (2006.01)
  *H05B 33/08* (2006.01)

(52) U.S. Cl.
  CPC ..... *H05B 33/0812* (2013.01); *H05B 33/0842* (2013.01); *H05B 33/0845* (2013.01); *H05B 33/0833* (2013.01)

(58) Field of Classification Search
  CPC ............ H05B 33/0833; H05B 33/0842; H05B 33/0845

USPC ............................................. 315/185 R, 291
See application file for complete search history.

(56) References Cited

U.S. PATENT DOCUMENTS

| | | | |
|---|---|---|---|
| 6,249,417 B1* | 6/2001 | Pippen ................... | A01M 29/24 327/181 |
| 8,519,631 B2* | 8/2013 | Lee ...................... | H05B 33/0812 315/185 R |
| 2014/0191673 A1* | 7/2014 | Yoon .................. | H05B 33/0809 315/192 |

* cited by examiner

*Primary Examiner* — Thuy Vinh Tran
(74) *Attorney, Agent, or Firm* — Winston Hsu

(57) ABSTRACT

An LED driving circuit includes a charging-discharging circuit and a constant-current unit. The charging-discharging circuit is coupled to an AC current source, and includes an impedance, a diode and an energy storing circuit. The energy storing circuit is coupled to the impedance, the diode, and an LED unit. The constant-current unit is coupled to the charging-discharging circuit in series, and is arranged to regulate current. During the positive half cycle of the AC current source, the constant-current unit charges the energy storing circuit via the impedance; and during the negative half cycle of the AC current source, the energy storing circuit provides the LED unit with a discharging current via the diode, making the driving current of the LED driving circuit remain stable even when the AC current changes from the positive half cycle to the negative half cycle, thus preventing the flicker effect.

10 Claims, 3 Drawing Sheets

LIGHT EMITTING DIODE DRIVING CIRCUIT WITH STABLE DRIVING CURRENT

BACKGROUND OF THE INVENTION

1. Field of the Invention

The present invention relates to a driving circuit, and more particularly, to a light emitting diode (LED) driving circuit with reduced flicker effect.

2. Description of the Prior Art

Environmental awareness has increased in recent years, leading to many policies aimed at environmental protection. Many countries have begun to actively promote energy conservation, carbon reduction, and environmental policies such as reducing power consumption of lamps by developing power-saving lighting devices. Light emitting diode (LED) devices are very popular due to their energy-saving, long service life and high durability. Hence, LED lighting devices have been applied to a large variety of applications and are gradually replacing traditional lamps.

A typical household power supply provides alternating current (AC). Since AC current can be considered as sinusoidal waves, the provided power may suddenly drop during the negative half cycle of a sinusoidal wave (i.e. when the sinusoidal wave declines), giving a current which is not large enough to drive LEDs. As a result, a flicker effect will occur on the emitted light. Recent studies indicate that this flicker effect may negatively affect human bodies causing headaches, fatigue, and vision loss, even when it cannot be observed by the naked eye.

Therefore, how to improve LED driving circuits is an important issue in the field.

SUMMARY OF THE INVENTION

In view of this, the present invention provides a charging-discharging circuit in an LED driving circuit, wherein the charging-discharging circuit is coupled to an LED unit in parallel. In this way, the LED unit can be provided with a discharging current during the negative half cycle of the AC power to prevent the sudden drop of the driving current of LEDs. Hence, the flicker effect problem of the related art LED driving circuits can be resolved.

A first embodiment of the present invention provides an LED driving circuit arranged for at least driving a first LED unit. The first LED unit comprises a first node and a second node. The first LED unit comprises at least one LED. The LED driving circuit comprises a first charging-discharging circuit, at least one first constant-current unit and a second constant-current unit. The first charging-discharging circuit is coupled to an AC current source, and comprises a first impedance, a first diode and a first energy storing circuit. The first impedance comprises a first node and a second node. The first diode comprises a first node and a second node, wherein the first node of the first diode is coupled to the first node of the first impedance, and the second node of the first diode is coupled to the second node of the first impedance. The first energy storing circuit comprises a first node and a second node. The first node of the first energy storing circuit is coupled to the second node of the first impedance and the second node of the first diode. The second node of the first energy storing circuit is coupled to the second node of the first LED unit. The first constant-current unit is coupled to the first node of the first charging-discharging circuit for regulating current. The first node of the first LED unit is coupled to the first constant-current unit. During the positive half cycle of the AC current source, the first constant-current unit charges the first energy storing circuit via the first impedance; and during the negative half cycle of the AC current source, the first energy storing circuit provides the first LED unit with a discharging current via the first diode. The second constant-current unit is coupled in series to the first LED unit and is arranged to regulate current, wherein the combination of the serially-coupled second constant-current unit and first LED unit is coupled to the first charging-discharging circuit in parallel.

A second embodiment of the present invention provides an LED driving circuit for at least driving a first LED unit. The first LED unit comprises a first node and a second node. The first LED unit comprises at least one LED. The LED driving circuit comprises a first charging-discharging circuit, a second charging-discharging circuit, at least one first constant-current unit, a second constant-current unit and a third constant-current unit. The first charging-discharging circuit is coupled to an AC current source, and comprises a first impedance, a first diode and a first energy storing circuit. The first impedance comprises a first node and a second node. The first diode comprises a first node and a second node, wherein the first node of the first diode is coupled to the first node of the first impedance, and the second node of the first diode is coupled to the second node of the first impedance. The first energy storing circuit comprises a first node and a second node. The first node of the first energy storing circuit is coupled to the second node of the first impedance and the second node of the first diode. The second node of the first energy storing circuit is coupled to the second node of the first LED unit. The first constant-current unit is coupled to the first node of the first charging-discharging circuit, and is arranged to regulate current. The first node of the first LED unit is coupled to the first constant-current unit. During the positive half cycle of the AC current source, the first constant-current unit charges the first energy storing circuit via the first impedance; and during the negative half cycle of the AC current source, the first energy storing circuit provides the first LED unit with a discharging current via the first diode. The second constant-current unit is coupled to the first LED unit in series and is arranged to regulate current, wherein the combination of the serially-coupled second constant-current unit and first LED unit is coupled to the first charging-discharging circuit in parallel. The second charging-discharging circuit comprises a first node and a second node, wherein the first node of the second charging-discharging circuit are coupled to the first constant-current unit. The third constant-current unit is coupled to the second node of the second charging-discharging circuit.

A third embodiment of the present invention provides an LED driving circuit for at least driving a first LED unit. The first LED unit comprises a first node and a second node, the first LED unit comprises at least one LED, the LED driving circuit comprises a first charging-discharging circuit, at least one first constant-current unit and a plurality of second constant-current units. The first charging-discharging circuit is coupled to an AC current source, and comprises a first impedance, a first diode and a first energy storing circuit. The first impedance comprises a first node and a second node. The first diode comprises a first node and a second node. The first node of the first diode is coupled to the first node of the first impedance, and the second node of the first diode is coupled to the second node of the first impedance.

The first energy storing circuit comprises a first node and a second node. The first node of the first energy storing circuit is coupled to the second node of the first impedance and the second node of the first diode. The second node of the first energy storing circuit is coupled to the second node of the first LED unit. The first constant-current unit is coupled to the first node of the first charging-discharging circuit, and is arranged to regulate current. The first node of the first LED unit is coupled to the first constant-current unit. During the positive half cycle of the AC current source, the first constant-current unit charges the first energy storing circuit via the first impedance; and during the negative half cycle of the AC current source, the first energy storing circuit provides the first LED unit with a discharging current via the first diode. The plurality of second constant-current units is coupled to the first charging-discharging circuit in parallel, wherein the plurality of second constant-current units are coupled in parallel to one another.

By utilizing the architectures mentioned above, the driving current of the LED driving circuit can remain stable without a sudden rise or drop, even when the AC current changes from the positive half cycle to the negative half cycle. The present invention may greatly reduce the flicker effect of the related art techniques, thus providing a better user experience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
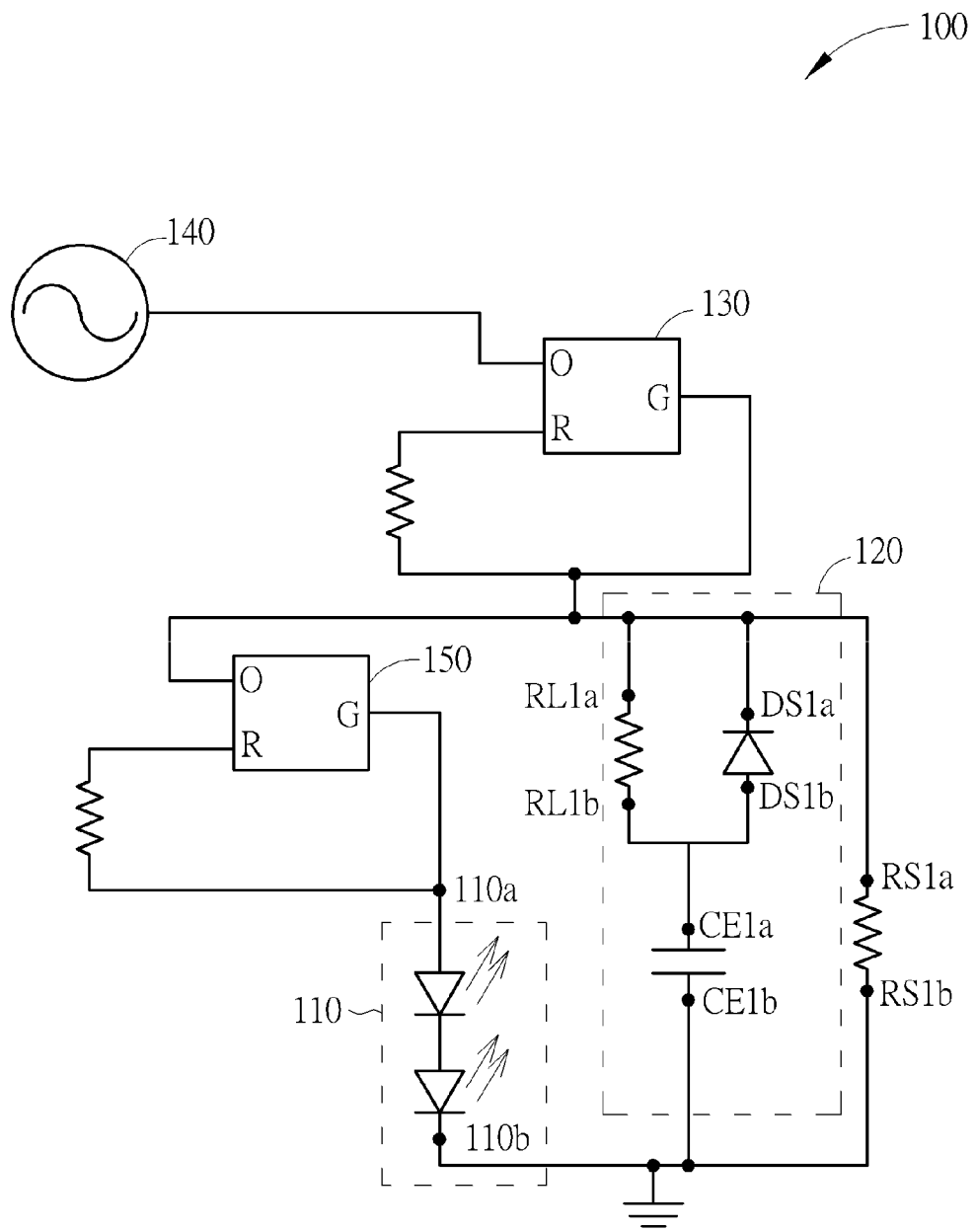
FIG. 1 is a diagram illustrating an LED driving circuit according to a first embodiment of the present invention.

Refer to FIG. 1, which is a diagram illustrating an LED driving circuit 100 according to a first embodiment of the present invention. The LED driving circuit 100 is a first-order circuit, and arranged to at least drive an LED unit 110. The LED unit 110 comprises a first node 110a and a second node 110b, wherein the LED unit 110 may comprise one or more LEDs. The LED driving circuit 100 comprises a charging-discharging circuit 120, an impedance RS1 and constant-current units 130 and 150. The charging-discharging circuit 120 is coupled to an AC current source 140, and comprises an impedance RL1, a diode DS1 and an energy storing circuit CE1. Each of the impedances RL1 and RS1 can be a resistor, and the energy storing circuit CE1 can be a capacitive element (e.g. a capacitor). The present invention is not limited thereto, however. The impedance RL1 comprises a first node RL1a and a second node RL1b. The diode DS1 comprises a first node DS1a and a second node DS1b. The first node DS1a of the first diode DS1 is coupled to the first node RL1a of the impedance RL1, and the second node DS1b of the diode DS1 is coupled to the second node RL1b of the impedance RL1. The energy storing circuit CE1 comprises a first node CE1a and a second node CE1b. The first node CE1a of the energy storing circuit CE1 is coupled to the second node RL1b of the impedance RL1 and the second node DS1b of the diode DS1. The second node CE1b of the energy storing circuit CE1 is coupled to the second node 110b of the LED unit 110. The constant-current unit 130 is coupled to the charging-discharging circuit 120 in series and is arranged for regulating current. In FIG. 1, the constant-current unit 130 is coupled to the top two nodes of the charging-discharging circuit 120, but the present invention is not limited thereto. The first node 110a of the LED unit 110 is coupled to the constant-current unit 150. During the positive half cycle of the AC current source 140 (e.g. the positive half cycle of a sinusoidal wave), the constant-current unit 130 charges the energy storing circuit CE1 via the impedance RL1. For example, when the constant-current unit 130 provides the LED unit 110 with a driving current, the energy storing circuit CE1 will also be charged via the impedance RL1. In addition, during the negative half cycle of the AC current source 140, the energy storing circuit CE1 provides the LED unit 110 with a discharging current via the diode DS1. For example, during a low power state of the AC current source (e.g. the negative half cycle), the constant-current unit 130 will stop providing the driving current to the LED unit 110. At the same time, the diode DS1 will be turned on, making the energy storing circuit CE1 provide the LED unit 110 with the discharging current via the diode DS1. In this way, the current provided to the LED unit 110 will remain stable without a sudden rise or drop, even when the AC current is changed from the positive half cycle to the negative half cycle. Hence, the present invention may greatly reduce the flicker effect of the related art techniques.

The impedance RS1 is coupled to the charging-discharging circuit 120 in parallel, wherein the first node RS1a of the impedance RS1 is coupled to the first node DS1a of the diode DS1 and the first node RL1a of the impedance RL1a. The second node RS1b of the impedance RS1 is coupled to the second node CE1b of the energy storing circuit CE1. When the AC current source 140 is shut down, the impedance RS1 is arranged to provide a path for leaking the remaining electric charges to the energy storing circuit CE1. For example, the energy storing circuit CE1 may release the remaining electric charges to ground via the impedance RS1.

The constant-current unit 150 is coupled to the LED unit 110 in series, and is arranged to regulate current, wherein the serially-coupled constant-current unit 150 and LED unit 110 are coupled to the charging-discharging circuit 120 in parallel. In other words, the unit comprising the constant-current unit 150 and the LED unit 110 is coupled to the charging-discharging circuit 120 in parallel. When the constant-current unit 150 is coupled to a capacitive element (e.g. the energy storing circuit CE1), the constant-current unit 150 may be used to match the resistance value on the current path to fine tune the discharging current of the capacitive element, in order to make the discharging current value of the capacitive element meet the requirements.

Each of the constant-current units 130 and 150 may comprise three pins "OUT, GND, and REXT" (denoted by "O, G, and R" in FIGS. 1, 2 and 3), wherein the pin "O" is a node for the power input and/or constant-current output, the pin "G" is a node coupled to ground, and the pin "R" is a node for setting the value of the output current. The above functions of pins are merely for illustrative purposes, and are not meant to be limitations of the present invention. In practice, the actual functions of the pins may change based on the circuit design. Further, the pin "R" of each of the constant-current unit 130 and 150 is coupled to a resistor which is used to set current values to provide a referential constant current, in order to make the LED driving circuit 100 operate normally.

The interactions between the LED unit 110, the charging-discharging circuit 120, and the constant-current units 130 and 150 are illustrated in the following example. When the operating voltage is normal (e.g. a level capable of turning on the driving constant-current unit 130), the constant-current units 130 and 150 will be enabled together. When the operating voltage is too low (e.g. a level incapable of turning on the driving constant-current unit 130), the constant-current unit 130 will not be enabled, and the energy storing circuit CE1 will discharge at this time. As a result, the constant-current unit 150 will still be normally enabled due to the discharging current from the energy storing circuit CE1, and therefore the flicker effect can be prevented/mitigated.

Figure 2:
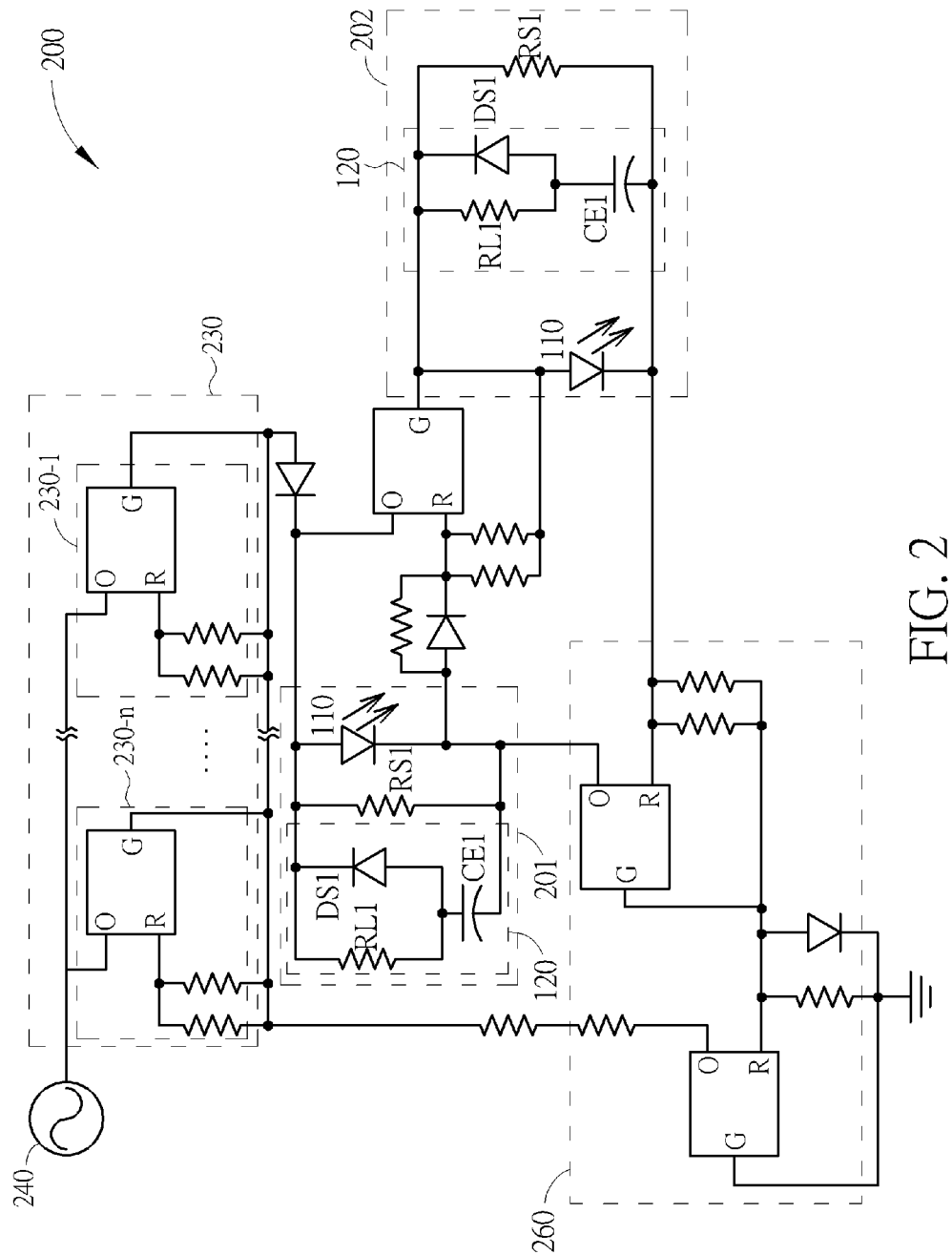
FIG. 2 is a diagram illustrating an LED driving circuit according to a second embodiment of the present invention.

FIG. 2 is a diagram illustrating an LED driving circuit 200 according to a second embodiment of the present invention. In this embodiment, the LED driving circuit 200 is a second-order circuit, and is arranged to drive the LED unit 110. The LED driving circuit 200 comprises the blocks 201, 202, 230 and 260. The elements in the blocks 201 and 202 (e.g. the charging-discharging circuit 120, impedance RS1 and LED unit 110) have been described in the previous embodiment, and are omitted here for brevity.

As shown in FIG. 2, the block 230 comprises a plurality of parallel-coupled constant-current units 230-1, 230-2, ..., 230-n, which are arranged to provide a constant current for the first-order circuit (i.e. the block 201) and the second-order circuit (i.e. the block 202), wherein the configuration of the parallel-coupled constant-current units can make the LED driving circuit 200 endure the power source having larger power. The number of the constant-current units can be changed according to the design requirements. In this embodiment, each of the upper ends and lower ends of the first-order circuit (i.e. the block 202) is serially-coupled to at least one constant-current unit (e.g. at least one constant-current unit in the block 230 and at least one constant-current unit in the block 260), in order to limit the amount of current. The upper nodes of the second-order circuit are coupled to at least one constant-current unit in series. In addition, the LED unit 110 in each of the first-order block 201 and the second-order block 202 is coupled to a corresponding energy storing circuit CE1 in parallel. Some operations of the LED driving circuit 200 similar to those of the LED driving circuit 100 are omitted here for brevity. Further, the configuration of the block 260 depicted in FIG. 2 is for illustrative purposes rather than a limitation of the present invention, and can be modified according to the design requirements.

The operations of the constant-current units 230-1, 230-2, ..., 230-n in the block 230 in FIG. 2 are similar to the operations of the constant-current unit 130. Detailed descriptions thereof are omitted here. Moreover, in this embodiment, the pin "R" in each of the constant-current units 230-1, 230-2, ..., 230-n is coupled to two parallel-coupled impedances. Compared with the configuration of merely coupling to one impedance in parallel, the configuration of coupling to multiple impedances in parallel as shown in this embodiment may further reduce the loadings of constant-current units, and raise the overall operating efficiency of the LED driving circuit 200.

Figure 3:
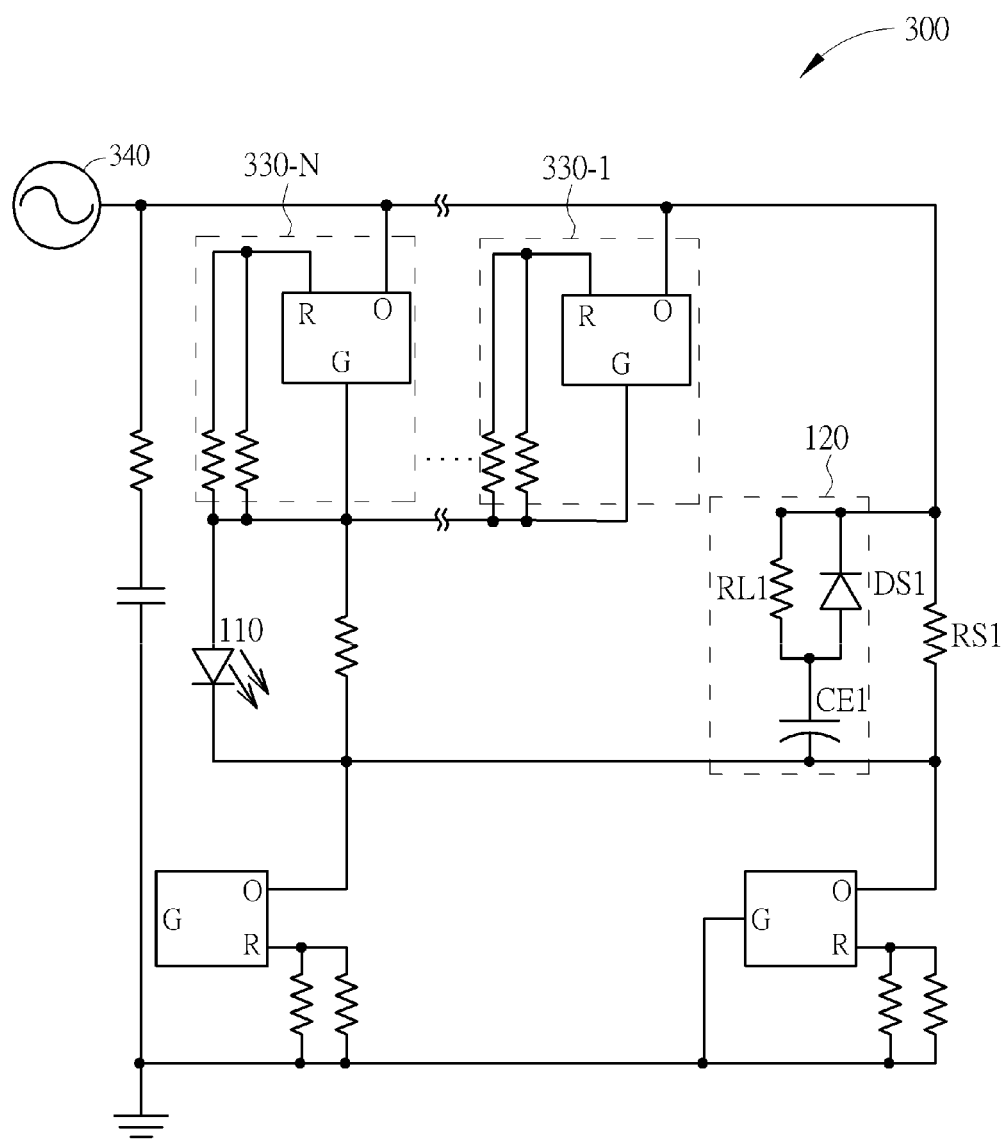
FIG. 3 is a diagram illustrating an LED driving circuit according to a third embodiment of the present invention.

FIG. 3 is a diagram illustrating an LED driving circuit 300 according to a third embodiment of the present invention. The LED driving circuit 300 is a first-order circuit, and comprises a plurality of constant-current units 330-1-330-n which are coupled to the charging-discharging circuit 120 in parallel, wherein the constant-current units 330-1-330-n are coupled in parallel to one another. In this embodiment, the set of parallel-coupled constant-current units (i.e. the constant-current units 330-1-330-n) is coupled to the LED unit 110 in series. The circuitry comprised/composed of the constant-current units 330-1-330-n and the LED unit 110 is coupled in parallel to the charging-discharging circuit 120 for performing matching operations upon the resistances of the current paths, in order to make the energy storing circuit CE1 have properly tuned charging and discharging currents. Compared with the first embodiment, a constant-current unit for coupling to the charging-discharging circuit 120, such as the constant-current unit 130 in FIG. 1, is removed/omitted in this embodiment.

Under the configuration in this embodiment, the constant-current units 330-1-330-n will not be disabled due to an insufficient operating voltage. Hence, the constant-current units 330-1-330-n remain turned on regardless of whether the LED driving circuit 300 is in a charging state or a discharging state. The configuration of the coupling of two parallel-coupled resistors in each constant-current unit of the constant-current units 330-1-330-n is for raising the accuracy of the provided current. The multiple parallel-coupled constant-current units 330-1-330-n can provide a maximum constant-current value, and the number of the parallel-coupled constant-current units can be increased or decreased according to the design requirements. For example, if the supplied current amount is determined to be insufficient, an additional constant-current unit can be added in parallel to meet the demand.

In this embodiment, the pin "R" in each of the constant-current units 330-1-330-n is coupled to two parallel-coupled impedances. Compared with the configuration of merely coupling to one impedance in parallel, the configuration of coupling to multiple impedances in parallel may further reduce the loadings of constant-current units, and raise the overall operating efficiency of the LED driving circuit 300.

To summarize, by utilizing the architectures provided in the embodiments of the present invention, the driving current of the LED driving circuit is stable even when the AC current is changed from the positive half cycle to the negative half cycle. The present invention may greatly reduce the flicker problem that occurs in the related arts, thus providing a better user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light emitting diode (LED) driving circuit for at least driving a first LED unit, the first LED unit comprising a first node and a second node, the first LED unit comprising at least one LED, the LED driving circuit comprising:
  a first charging-discharging circuit which is coupled to an alternating-current (AC) current source, wherein the first charging-discharging circuit comprising;
    a first impedance, comprising a first node and a second node;
    a first diode, comprising a first node and a second node, wherein the first node of the first diode is coupled to the first node of the first impedance and the second node of the first diode is coupled to the second node of the first impedance; and
    a first energy storing circuit, comprising a first node and a second node, wherein the first node of the first energy storing circuit is coupled to the second node of the first impedance and the second node of the first diode, and the second node of the first energy storing circuit is coupled to the second node of the first LED unit; and at least one first constant-current unit, serially-coupled to a first end of the first charging-discharging circuit, wherein the first constant-current unit is arranged to regulate current, and the first node of the first LED unit is coupled to the first constant-current unit;

wherein during a positive half cycle of the AC current source, the first constant-current unit charges the first energy storing circuit via the first impedance; and during a negative half cycle of the AC current source, the first energy storing circuit provides discharging current to the first LED unit via the first diode.

2. The LED driving circuit of claim 1, further comprising;
a second impedance, comprising a first node and a second node, wherein the first node of the second impedance is coupled to the first node of the first impedance, the second node of the second impedance is coupled to the second node of the first energy storing circuit, and the second impedance is arranged to provide the first energy storing circuit with a path for releasing remaining electric charges after the AC current source is shut down.

3. The LED driving circuit of claim 1, further comprising;
a second constant-current unit, coupled to the first LED unit in series, wherein the second constant-current unit is arranged to regulate current, and a combination of the serially-coupled second constant-current unit and first LED unit is coupled to the first charging-discharging circuit in parallel.

4. The LED driving circuit of claim 3, further comprising;
a second charging-discharging circuit, comprising a first node and a second node, wherein the first node of the second charging-discharging circuit is coupled to the first constant-current unit; and
a third constant-current unit, coupled to the second node of the second charging-discharging circuit.

5. The LED driving circuit of claim 4, wherein the second charging-discharging circuit comprises;

a second impedance, comprising a first node and a second node;
a second diode, comprising a first node and a second node, wherein the first node of the second diode is coupled to the first node of the second impedance, and the second node of the second diode is coupled to the second node of the second impedance; and
a second energy storing circuit, comprises a first node and a second node, wherein the first node of the second energy storing circuit is coupled to the second node of the second impedance and the second node of the second diode.

6. The LED driving circuit of claim 5, further comprising;
a third impedance, comprising a first node and a second node, wherein the first node of the third impedance is coupled to the first node of the second impedance, the second node of the third impedance is coupled to the second node of the second energy storing circuit, and the third impedance is arranged to provide the second energy storing circuit with a path for releasing remaining electric charges after the AC current source is shut down.

7. The LED driving circuit of claim 5, wherein the second charging-discharging circuit is coupled to a second LED unit in parallel, the second LED unit comprising at least one LED.

8. The LED driving circuit of claim 4, wherein the first charging-discharging circuit is a second-order circuit, and the second charging-discharging circuit is a first-order circuit.

9. The LED driving circuit of claim 1, further comprising;
a plurality of second constant-current units coupled to the first charging-discharging circuit in parallel, wherein the plurality of second constant-current units are coupled in parallel to one another.

10. The LED driving circuit of claim 1, wherein each first constant-current unit of the first constant-current unit comprises at least one impedance arranged to set current values.

* * * * *